US012516685B2

(12) United States Patent
Li et al.

(10) Patent No.: US 12,516,685 B2
(45) Date of Patent: Jan. 6, 2026

(54) HYDRAULIC SYSTEM, METHOD, AND INTEGRATED VALVE BLOCK OF SLEWING MECHANISM

(71) Applicant: SHANDONG UNIVERSITY, Jinan (CN)

(72) Inventors: Lei Li, Jinan (CN); Bin Zou, Jinan (CN); Jikai Liu, Jinan (CN); Peizhi Zhuang, Jinan (CN); Chengyu Li, Jinan (CN)

(73) Assignee: SHANDONG UNIVERSITY (CN)

( * ) Notice: Subject to any disclaimer, the term of this patent is extended or adjusted under 35 U.S.C. 154(b) by 0 days.

(21) Appl. No.: 18/766,679

(22) Filed: Jul. 9, 2024

(65) Prior Publication Data

US 2025/0137476 A1 May 1, 2025

(30) Foreign Application Priority Data

Oct. 30, 2023 (CN) ......................... 202311423441.8

(51) Int. Cl.
*F15B 15/06* (2006.01)
*F15B 11/18* (2006.01)
(Continued)

(52) U.S. Cl.
CPC .......... *F15B 13/027* (2013.01); *F15B 11/186* (2013.01); *F15B 11/22* (2013.01); *F15B 15/061* (2013.01)

(58) Field of Classification Search
CPC ........ F15B 11/186; F15B 11/22; F15B 15/06; F15B 15/061; E02F 9/12; E02F 9/123
See application file for complete search history.

(56) References Cited

U.S. PATENT DOCUMENTS 4,344,733 A * 8/1982 Hirsch ...................... E02F 3/32 91/395
4,757,685 A * 7/1988 Burckhartzmeyer ........................ E02F 9/2296 137/596.2

(Continued)

FOREIGN PATENT DOCUMENTS

CN 106801691 A 6/2017
CN 211525242 U 9/2020

(Continued)

*Primary Examiner* — Michael Leslie

(57) ABSTRACT

The invention relates to a hydraulic system, method, and integrated valve block for a slewing mechanism, comprising a first and second cylinder. The rod cavity of the first cylinder connects to the rodless cavity of the second cylinder through the first oil circuit, first hydraulic control check valve, and fourth oil circuit. The rodless cavity of the first cylinder connects to the rod cavity of the second cylinder through the second oil circuit, second hydraulic control check valve, and third oil circuit. The first oil circuit is connected to the directional valve through the sixth oil circuit, and the second oil circuit is connected to the directional valve through the fifth oil circuit. The directional valve is connected to the hydraulic pump and oil tank. The first hydraulic control check valve is installed between the first and fourth oil circuits, and the second hydraulic control check valve is between the second and third oil circuits. The check valves' control circuits connect to the sixth oil circuit, ensuring braking stability of the slewing mechanism.

4 Claims, 10 Drawing Sheets

(51) Int. Cl.

| | |
|---|---|
| ***F15B 11/22*** | (2006.01) |
| ***F15B 13/02*** | (2006.01) |

(56) References Cited

U.S. PATENT DOCUMENTS

| | | | | | |
|---|---|---|---|---|---|
| 5,025,626 | A * | 6/1991 | Crosser | F15B 11/0445 60/466 |
| 5,413,452 | A * | 5/1995 | Lech | E02F 9/2221 91/516 |
| 5,653,155 | A * | 8/1997 | Hausman | F15B 21/087 91/511 |
| 6,520,731 | B2 * | 2/2003 | MacLeod | E02F 3/384 60/473 |
| 6,959,726 | B2 * | 11/2005 | Jervis | F15B 21/008 137/512.1 |
| 7,059,126 | B2 * | 6/2006 | Ma | E02F 9/2207 91/392 |
| 9,816,539 | B1 * | 11/2017 | Petricio Yaksic | F15B 11/22 |
| 10,820,513 | B2 * | 11/2020 | Hunt | F15B 13/021 |
| 2022/0251802 | A1 | 8/2022 | Konda et al. | |

FOREIGN PATENT DOCUMENTS

| | | | |
|---|---|---|---|
| CN | 218093665 | U | 12/2022 |
| JP | 2018127827 | A | 8/2018 |

* cited by examiner

HYDRAULIC SYSTEM, METHOD, AND INTEGRATED VALVE BLOCK OF SLEWING MECHANISM

TECHNICAL FIELD

The invention relates to the field of hydraulic control technology, in particular to a hydraulic system, a method, and an integrated valve block of a slewing mechanism.

BACKGROUND ART

The statement here only provides background technology relevant to the invention and does not necessarily constitute existing technology.

The lever-type slewing mechanism with double hydraulic cylinders is a commonly used slewing mechanism at the digging end of the backhoe loader, which controls the left and right rotation of the digging end by controlling the expansion and extension of the piston rods in the two hydraulic cylinders. The hydraulic system is powered by a hydraulic pump, and the flow direction of the hydraulic oil is controlled by a three-position four-way directional valve, thereby realizing the expansion of the piston rods of the two hydraulic cylinders, the rodless cavity and rod cavity of the two hydraulic cylinders are connected by X cross form. When the hydraulic oil flows out from the hydraulic pump and flows into the rodless cavity of the second hydraulic cylinder and the rod cavity of the first hydraulic cylinder through the directional valve, the piston rod of the second hydraulic cylinder extends, and the piston rod of the first hydraulic cylinder retracts, which will drive the digging end of the backhoe loader to turn left accordingly. Similarly, when the hydraulic oil from the hydraulic pump flows into the rodless cavity of the first hydraulic cylinder and the rod cavity of the second hydraulic cylinder through the directional valve, the piston rod of the first hydraulic cylinder extends, and the piston rod of the second hydraulic cylinder retracts, which will drive the digging end of the backhoe loader to turn right accordingly.

However, for this structure, when the digging end of the backhoe loader is quickly braked in the rotary state, that is, the directional valve is switched from the left or right to the median, although the directional valve has cut off the oil supply circuit to the hydraulic cylinder, the digging working device is a large inertia body, and because the four cavities of the first and second cylinders are interconnected, the internal hydraulic oil will move, and the existence of inertia will cause internal pressure and flow pulsation, which makes the boom swing several times before stopping during braking, which greatly affects the stability of the backhoe loader.

SUMMARY

Given the shortcomings of the existing technology, the purpose of the invention is to disclose a hydraulic system, a method, and an integrated valve block of a slewing mechanism, it can reduce the swing amplitude and frequency of the boom when the slewing mechanism is braked and improve the working stability of the slewing mechanism.

In order to achieve the above purpose, the invention is realized by the following technical solution:

In a first aspect, the embodiment of the invention discloses a hydraulic system of a slewing mechanism, comprising a first cylinder and a second cylinder, a rod cavity of the first cylinder is connected to a rodless cavity of the second cylinder through a first oil circuit, a first hydraulic control check valve, and a fourth oil circuit set in turn, a rod cavity of the second cylinder is connected to a rodless cavity of the first cylinder through a second oil circuit, a second hydraulic control check valve and a third oil circuit set in turn, the first oil circuit is connected to a directional valve through a sixth oil circuit, the second oil circuit is connected to the directional valve through a fifth oil circuit, a directional valve is connected to a hydraulic pump and an oil tank, a control circuit of the first hydraulic control check valve and the second hydraulic control check valve is connected to a sixth oil circuit;

- the first hydraulic control check valve is unidirectionally conducted in a direction away from the rodless cavity of the second cylinder, and the second hydraulic control check valve is unidirectionally conducted in a direction toward the rodless cavity of the first cylinder.

Optionally, the directional valve adopts a three-position four-way directional valve.

Optionally, the oil circuit between the hydraulic pump and the directional valve is equipped with an overflow valve, the overflow valve is connected to the oil tank.

In a second aspect, the embodiment of the invention discloses a method for the hydraulic system of the slewing mechanism described in the first aspect:

- supplying oil to the rod cavity of the first cylinder through the sixth oil circuit and the first oil circuit by the directional valve, and contracting a piston rod of the first cylinder, at the same time, controlling an oil supply of the oil circuit to open a valve core of the first hydraulic control check valve, feeding oil into the rodless cavity of the second cylinder via the fourth oil circuit, extending the piston rod of the second cylinder to realize a rotation of the slewing mechanism in a first direction;
- when the slewing mechanism is braked in a rotating state in the first direction, the directional valve works, and stops supplying oil to the sixth oil circuit and the control circuit, the oil in the rodless cavity of the first cylinder cannot flow under an action of the second hydraulic control check valve, thus cutting off an oil channeling between the first cylinder and the second cylinder;
- supplying oil to the rodless cavity of the first cylinder through the fifth oil circuit, the second hydraulic control check valve, and the third oil circuit by the directional valve, and supplying oil to a rod cavity of the second cylinder through the second oil circuit, extending the piston rod of the first cylinder and retracting the piston rod of the second cylinder to realize a rotation of the slewing mechanism in the second direction opposite to the first direction;
- when the slewing mechanism is braked in a rotating state in the second direction, the directional valve works, and stops supplying oil to the fifth oil circuit, the oil in the rod cavity of the first cylinder cannot flow under an action of the first hydraulic control check valve, thus cutting off the oil channeling between the first cylinder and the second cylinder.

In a third aspect, the embodiment of the invention discloses an integrated valve block, comprising a valve block body, the valve block body is provided with a fifth channel extending to one side of the valve block body to form a first oil port, the valve block body is provided with a sixth channel extending to the other side of the valve block body to form a second oil port, a top surface of the valve block body is provided with the first hydraulic control check valve and the second hydraulic control check valve, a free flow outlet of the first hydraulic control check valve is connected to the sixth channel through a first connecting channel, and a free flow inlet of the first hydraulic control check valve is connected to an interface of the rodless cavity of the second cylinder through a fourth channel, a free flow inlet of the second hydraulic control check valve is connected to the fifth channel through a second connecting channel, a free flow outlet of the second hydraulic control check valve is connected to an interface of the rodless cavity of the first cylinder through a third channel, the fifth channel is connected to an interface of the rod cavity of the second cylinder through a second channel, the sixth channel is connected to an interface of the rod cavity of the first cylinder through the first channel, the sixth channel is connected to a control circuit interface of the first hydraulic control check valve through a control circuit channel of the first hydraulic control check valve, the sixth channel is connected to a control circuit interface of the second hydraulic control check valve through a control circuit channel of the second hydraulic control check valve.

Optionally, the first oil port, the second oil port, the interface of the rod cavity of the first cylinder, the interface of the rodless cavity of the first cylinder, the interface of the rod cavity of the second cylinder, and the interface of the rodless cavity of the second cylinder are all equipped with pipe joints.

Optionally, the pipe joint adopts a straight thread connector-assembly.

Optionally, the first connecting channel comprises a first connecting part and a second connecting part, the two connecting parts are perpendicular to each other, and one end of the second connecting part extends to a top surface of the valve block body and is connected to the free flow outlet of the first hydraulic control check valve, the other end is connected to the first connecting part, one end of the first connecting part is connected to the sixth channel, and the other end extends to a side of the valve block body and is plugged by a plugging device.

Furthermore, the second connecting channel comprises a third connecting part and a fourth connecting part, the two connecting parts are perpendicular to each other, and one end of the fourth connecting part extends to the top surface of the valve block body and is connected to the free flow inlet of the second hydraulic control check valve, and the other end is connected to the third connecting part, one end of the third connecting part is connected to the fifth channel, and the other end extends to the side of the valve block body and is blocked by the plugging device.

In a fourth aspect, the embodiment of the invention provides the hydraulic system of the slewing mechanism, which is equipped with the integrated valve block described in the third aspect, in which the first oil port and the second oil port are connected to the directional valve, the interface of the rod cavity of the first cylinder is connected to the rod cavity of the first cylinder through an oil tube, the interface of the rodless cavity of the first cylinder is connected to the rodless cavity of the first cylinder through the oil tube, the interface of the rod cavity of the second cylinder is connected to the rod cavity of the second cylinder through the oil tube, the interface of the rodless cavity of the second cylinder is connected to the rodless cavity of the second cylinder through the oil tube, the directional valve is connected to the hydraulic pump and the oil tank.

The beneficial effects of the invention are as follows:

1. Through the setting of the first hydraulic control check valve, the second hydraulic control check valve, and the control circuit, when the directional valve is in the middle position to brake, the oil circuit between the first cylinder and the second cylinder is cut off because of the hydraulic system of the slewing mechanism of the invention, and the hydraulic oil between the two cylinders will stop moving, and the internal pressure and flow pulsation induced by inertia will be reduced, which will make the boom brake quickly and reduce the jitter amplitude, and at the same time reduce the damage to the cylinder and other hydraulic system components, and improve the stability and safety of the backhoe loader.
2. The integrated valve block of the invention, through the setting of the first channel, the second channel, and each interface, and the oil circuit of the first hydraulic control check valve and the second hydraulic control check valve is integrated inside the valve block body, so that when the first hydraulic control check valve and the second hydraulic control check valve are set, there is no need to set multiple tubings to cooperate with them, and the number of hydraulic control check valves is also reduced. The degree of change of the original hydraulic oil circuit of the slewing mechanism is reduced, and the change is simpler and faster, and the integrated valve block is small and easy to disassemble.

BRIEF DESCRIPTION OF THE DRAWINGS

The specification drawings that form part of the invention are used to provide further understanding of the invention, and the schematic embodiments and descriptions of the invention are used to explain the invention, which does not constitute an improper limitation of the invention.

Among them, 1. Rod cavity of the first cylinder, 2. The first cylinder, 3. The rodless cavity of the first cylinder, 4. The second hydraulic control check valve, 5. Control circuit of the second hydraulic control check valve, 6. Directional valve, 7. Hydraulic pump, 8. Overflow valve, 9. Oil tank, 10. Control circuit of the first hydraulic control check valve, 11. The first hydraulic control check valve, 12. Rodless cavity of the second cylinder, 13. The second cylinder, 14. The rod cavity of the second cylinder, 15. The first oil circuit, 16. The second oil circuit, 17. The third oil circuit, 18. The fourth oil circuit, 19. The fifth oil circuit, 20. The sixth oil circuit, 21. Straight thread short connector-assembly, 22. Valve block body, 23. Straight thread long connector-assembly, 24. Inner hexagonal screw plug, 25. Hinge hole bolt, 26. The first hydraulic control check valve, 27. The second hydraulic control check valve, 28. Screw, 29. The first side, 30. The first channel, 31. The third side, 32. The third connecting part, 33. The fourth connecting part, 34. The second connecting channel, 35. The third channel, 36. The second channel, 37. The fourth channel, 38. The first connecting channel, 39. The first connecting part, 40. The second connecting part, 41, The second side, 42. Control circuit channel of the first hydraulic control check valve, 43. The fifth channel, 44. The sixth channel, 45. Control circuit channel of the second hydraulic control check valve, 46. The fourth side, 47. The first oil port, 48. The second oil port, 49. Interface of the rod cavity of the first cylinder, 50. Interface of the second inner hexagonal screw plug, 51. Interface of the rodless cavity of the first cylinder, 52. Interface of the rod cavity of the second cylinder, 53. Interface of the rodless cavity of the second cylinder, 54. Interface of the first inner hexagonal screw plug, 55. Free flow inlet interface of the second hydraulic control check valve, 56. Free flow outlet interface of the second hydraulic control check valve, 57. Free flow inlet interface of the first hydraulic control check valve, 58. Free flow outlet interface of the first hydraulic control check valve, 59. Control circuit interface of the first hydraulic control check valve, 60. Control circuit interface of the second hydraulic control check valve, 61. Mounting hole of the hydraulic control check valve, 62. Mounting hole of the valve block body.

DETAILED DESCRIPTION OF THE EMBODIMENTS

Embodiment 1

Figure 1:
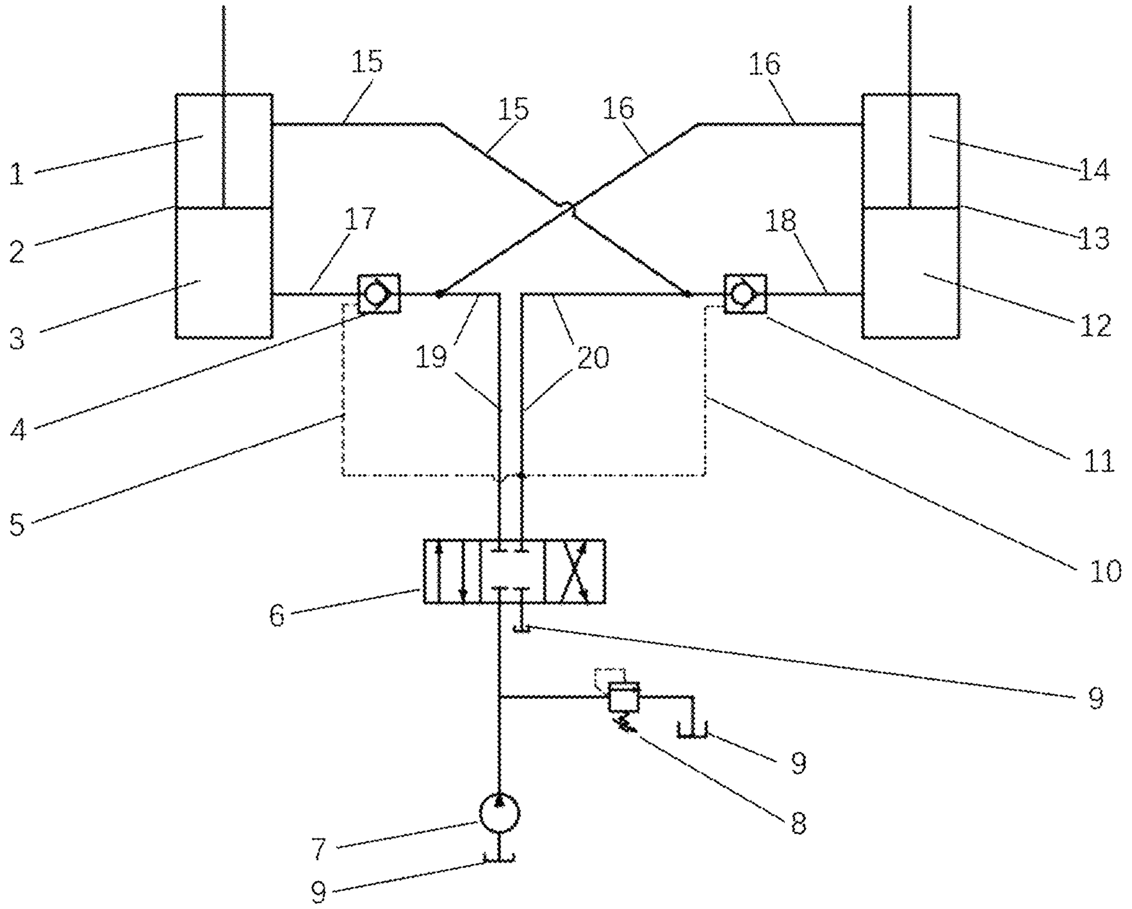
FIG. 1 is a schematic diagram of the hydraulic system of Embodiment 1 of the invention.
Figure 2:
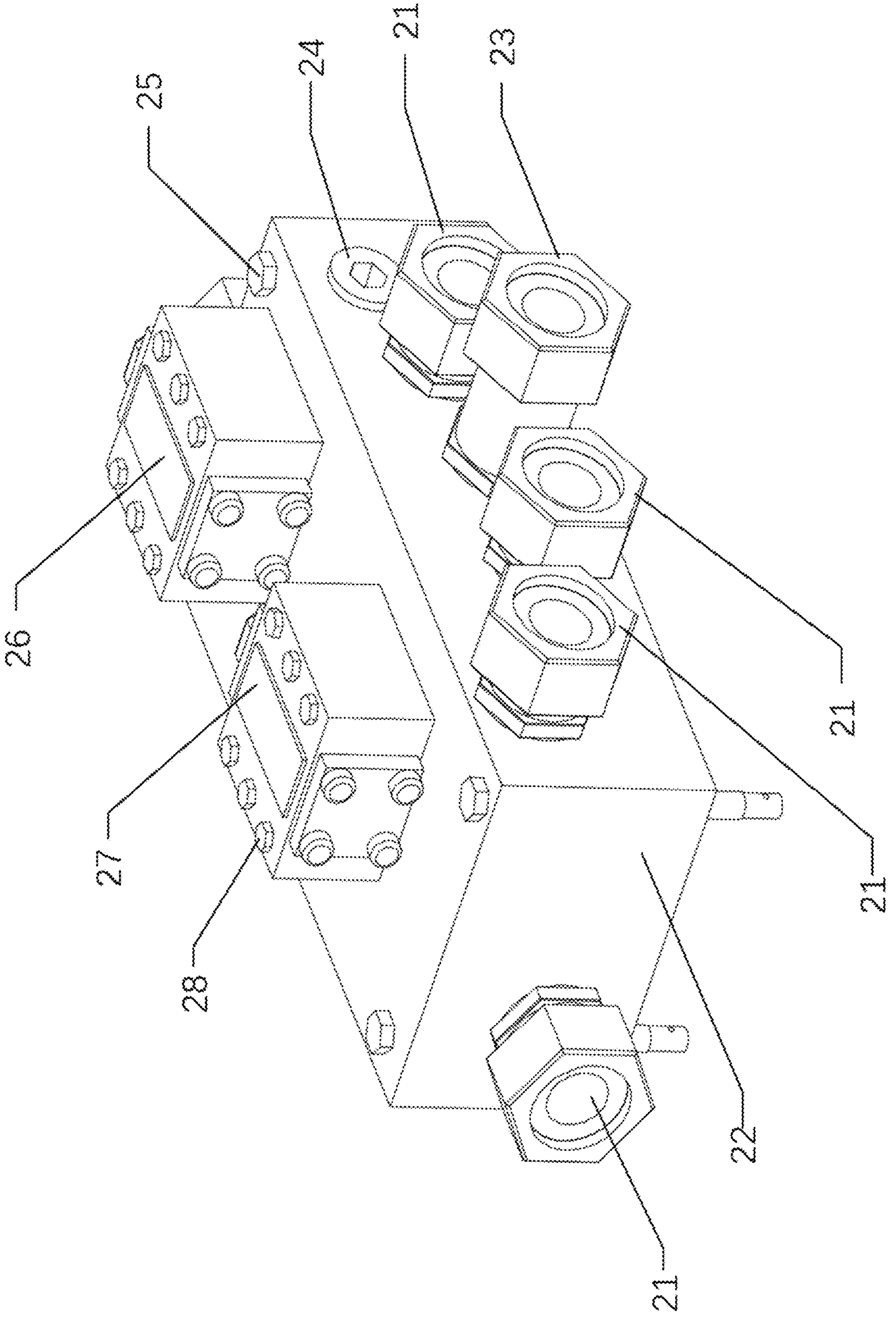
FIG. 2 is a schematic diagram of the overall structure of Embodiment 3 of the invention.
Figure 3:
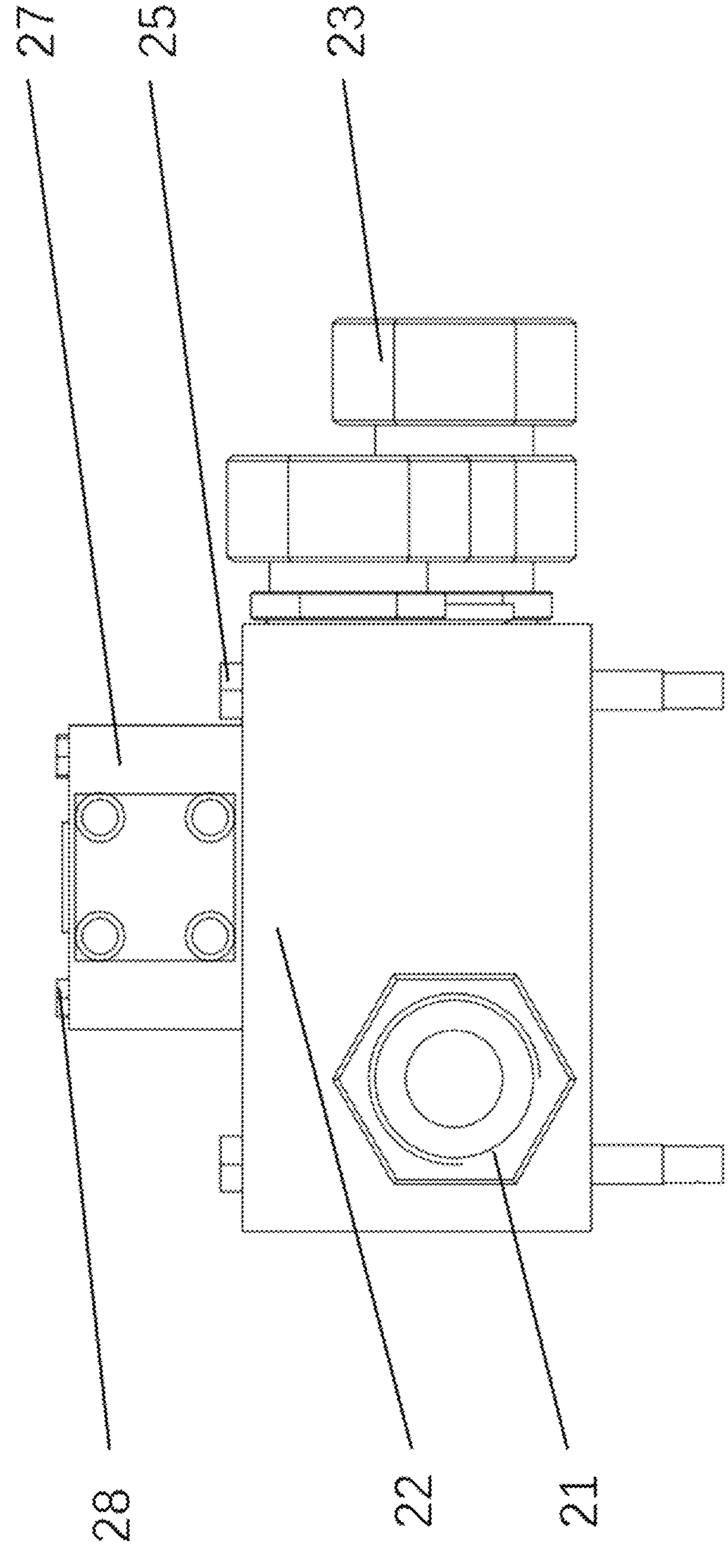
FIG. 3 is a left view of an overall structure of Embodiment 3 of the invention.
Figure 4:
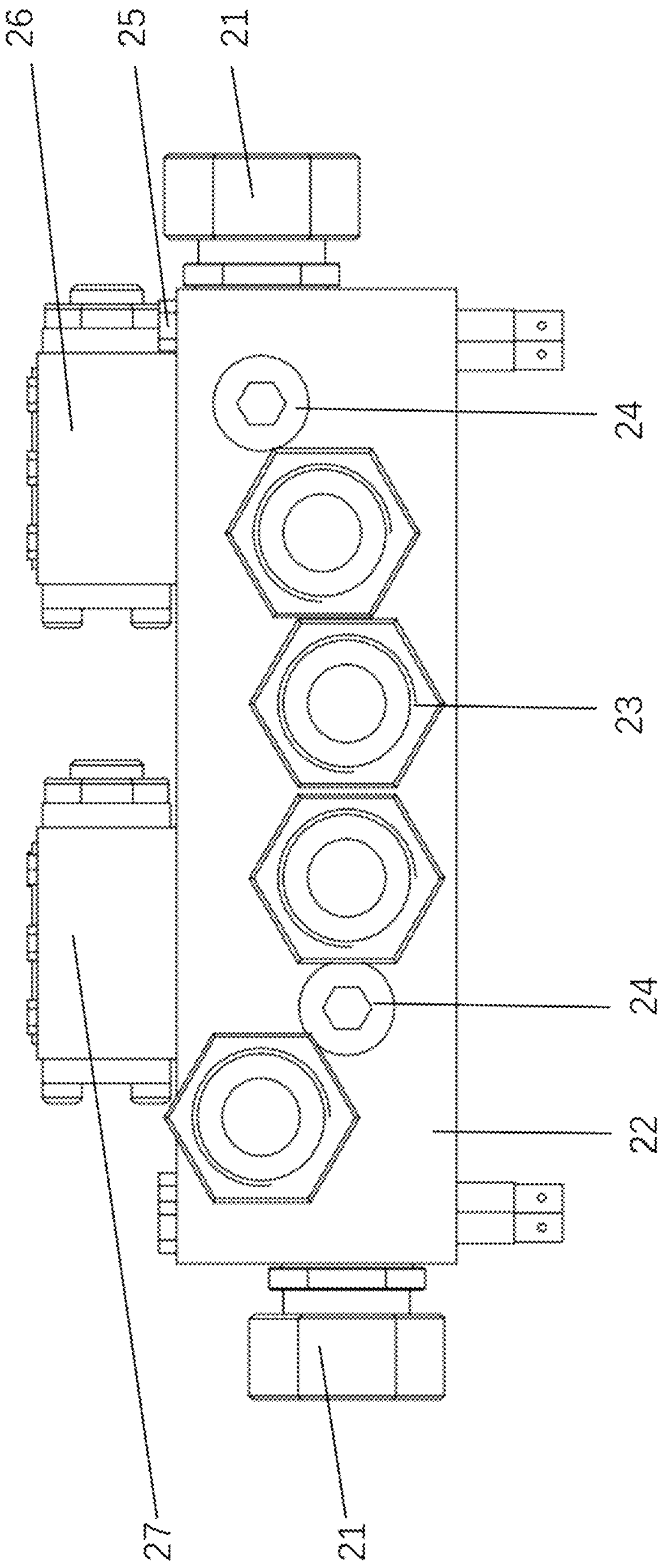
FIG. 4 is a main view of the overall structure of Embodiment 3 of the invention.
Figure 5:
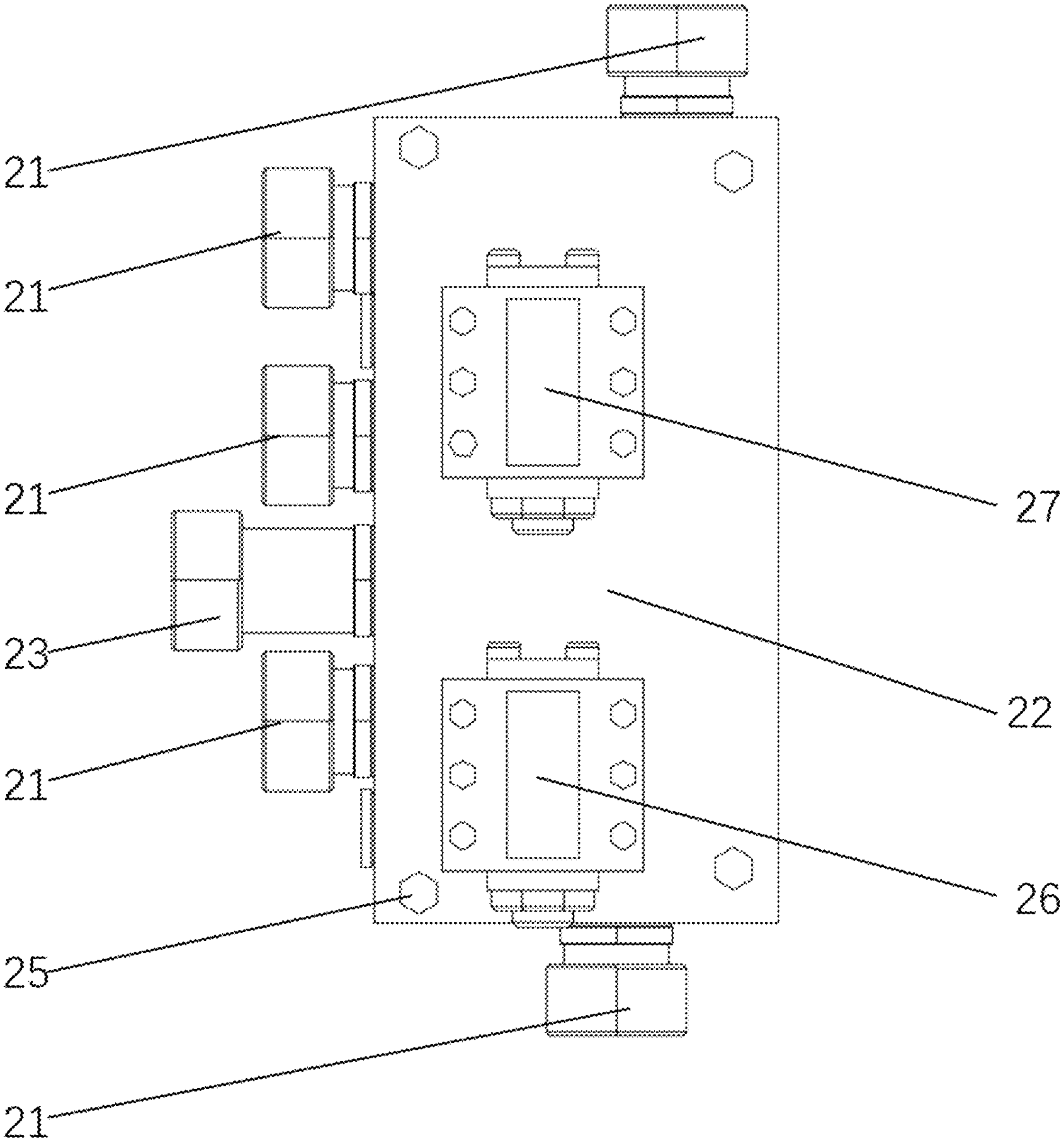
FIG. 5 is a top view of the overall structure of Embodiment 3 of the invention.
Figure 6:
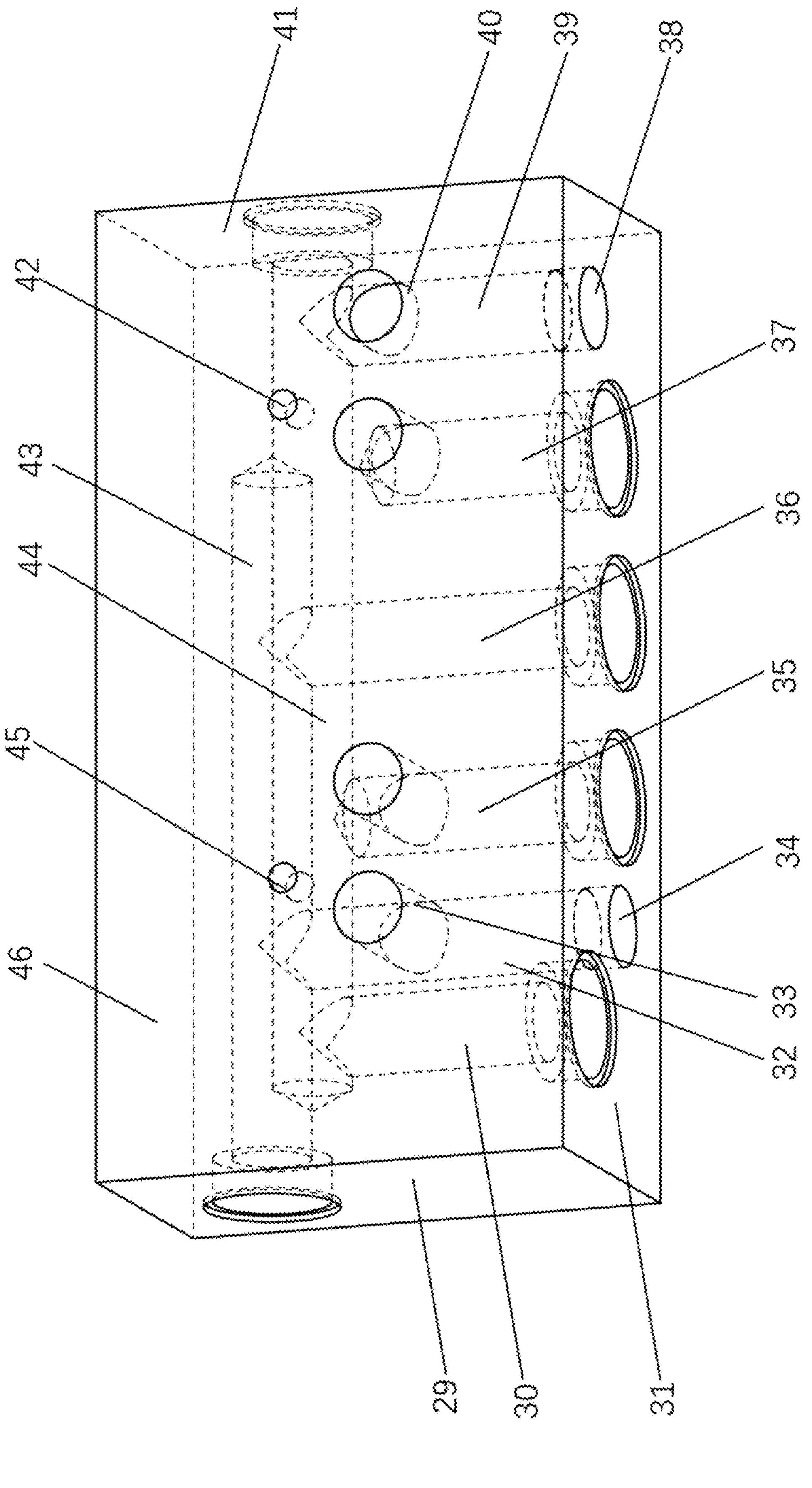
FIG. 6 is an oil circuit diagram of the valve block body of Embodiment 3 of the invention.
Figure 7:
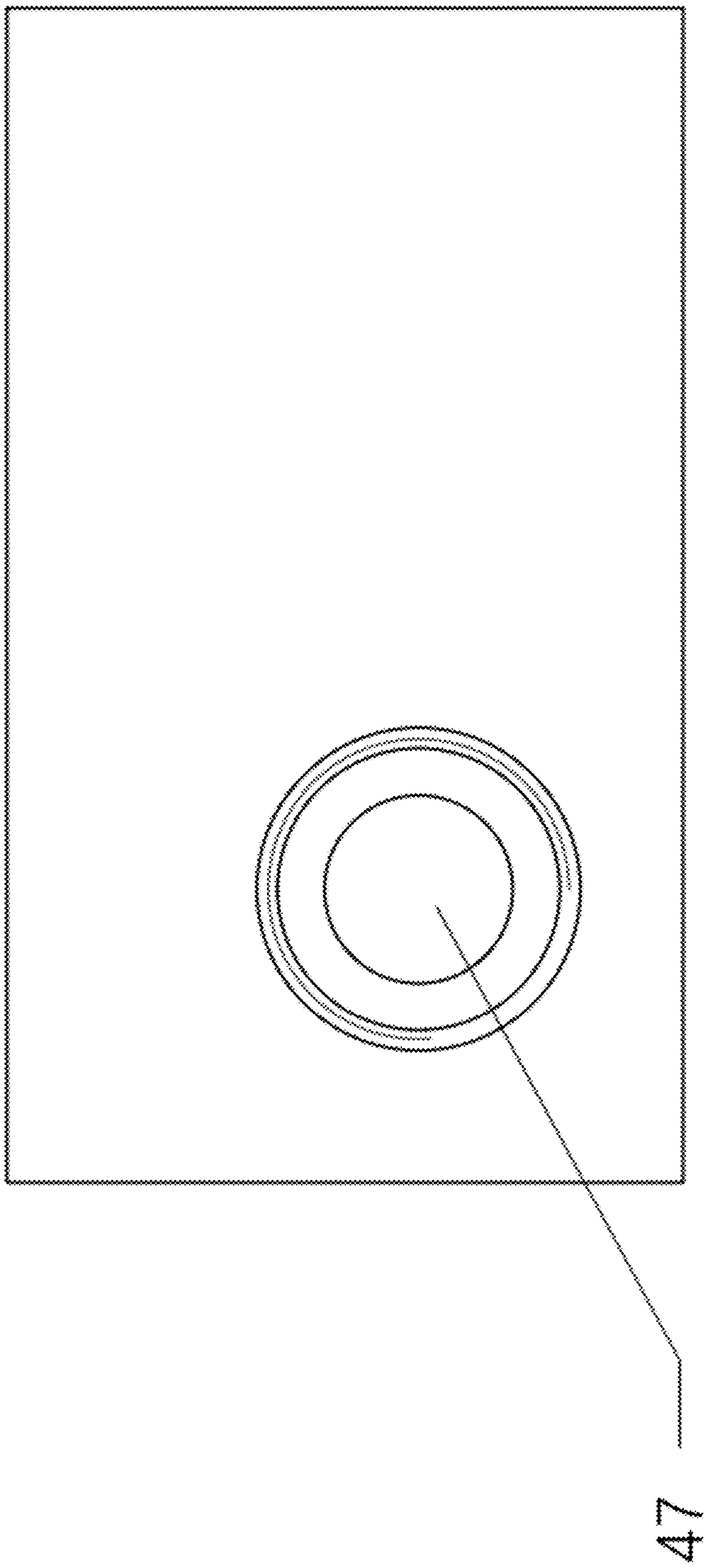
FIG. 7 is a left view of the valve block body of Embodiment 3 of the invention.
Figure 8:
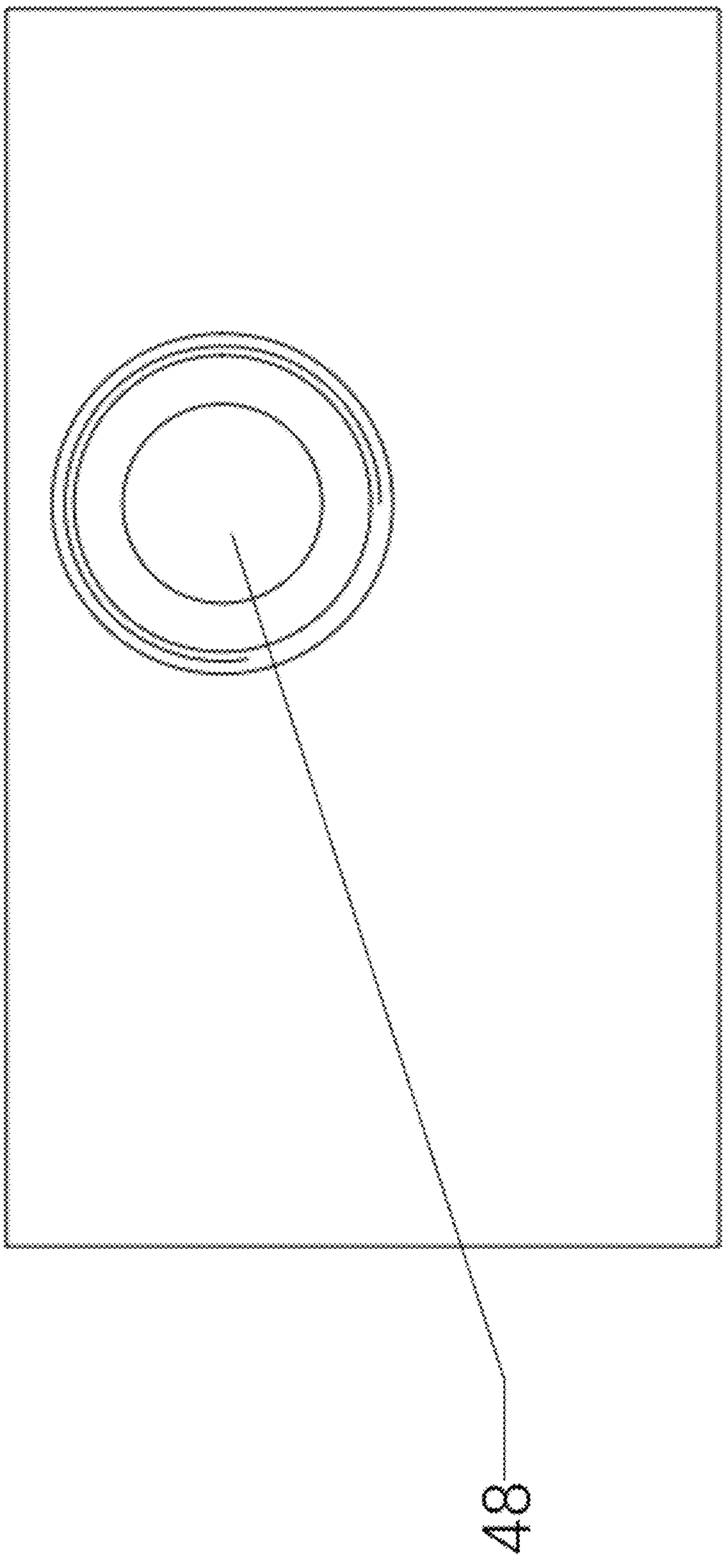
FIG. 8 is a right view of the valve block body of Embodiment 3 of the invention.
Figure 9:
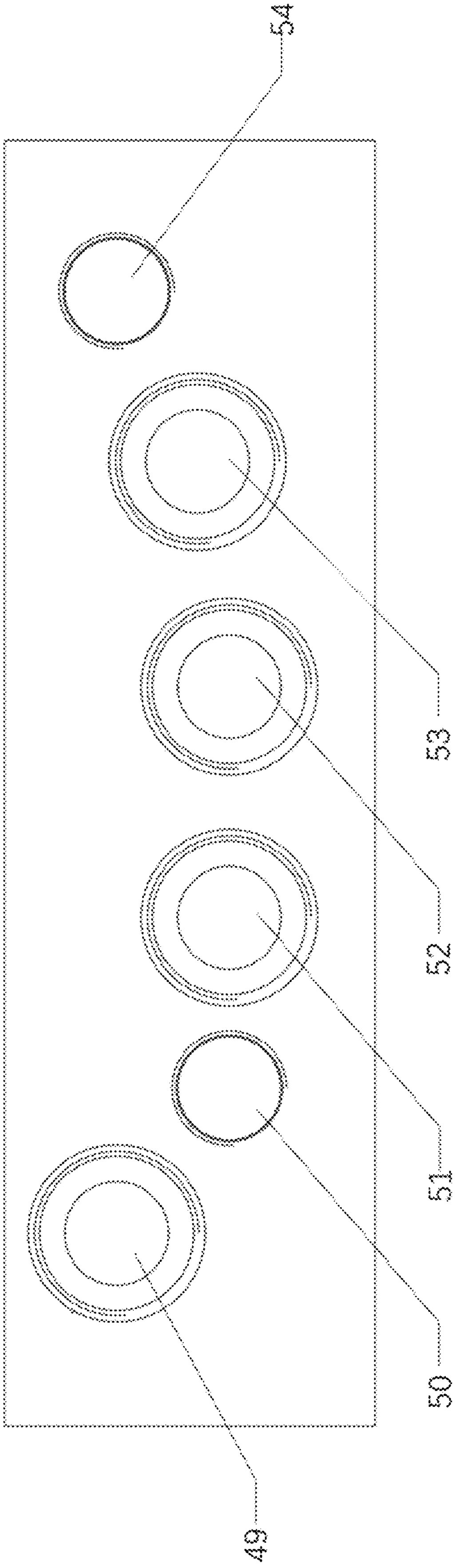
FIG. 9 is a main view of the valve block body of Embodiment 3 of the invention.
Figure 10:
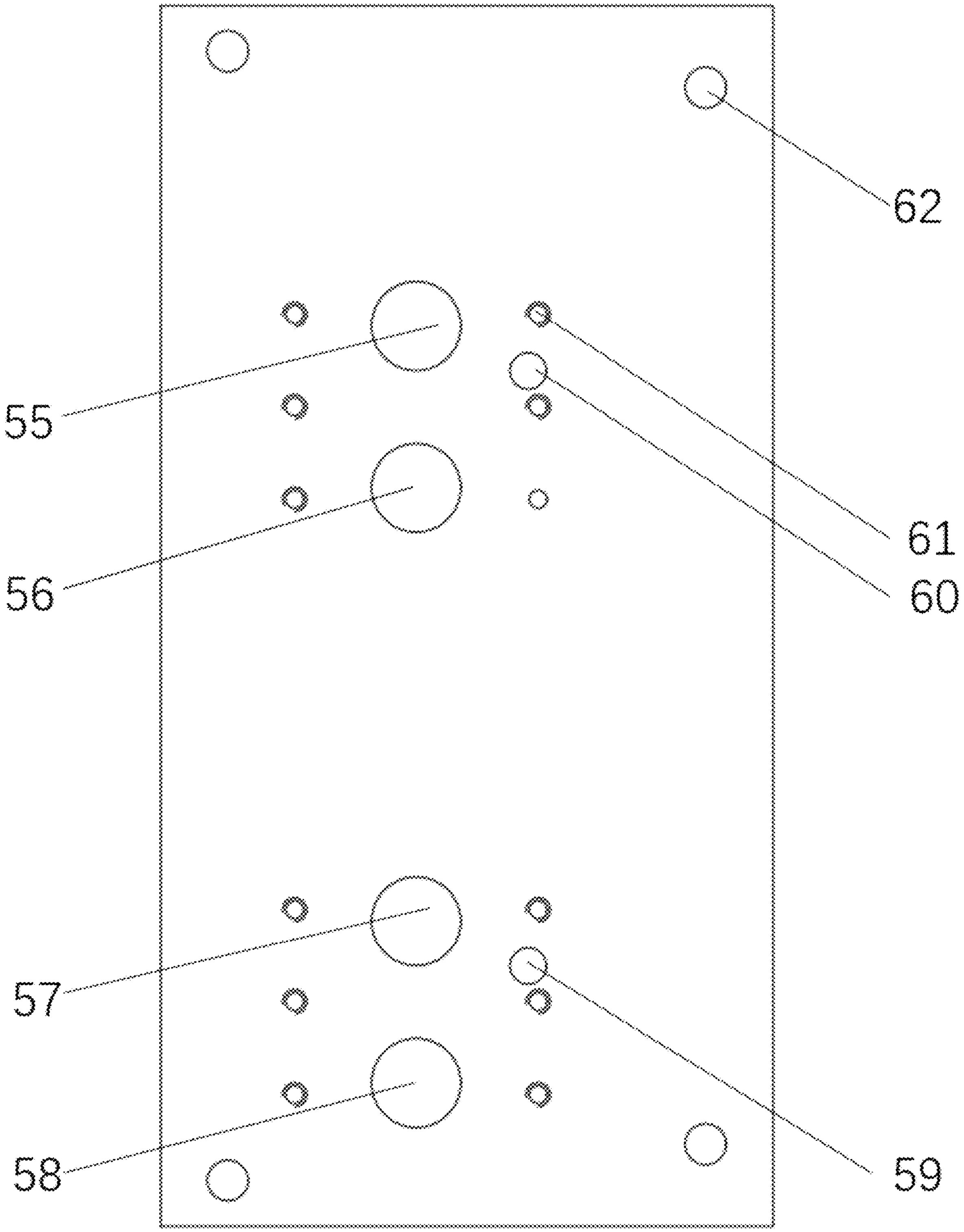
FIG. 10 is a top view of the valve block body of Embodiment 3 of the invention.

This embodiment discloses a hydraulic system of the slewing mechanism, as shown in FIG. 1, which is used to control the rotary motion of the backhoe loader, comprising the first cylinder 2 and the second cylinder 13, in which the first cylinder 2 comprises the rod cavity of the first cylinder 1 and the rodless cavity of the first cylinder 3, and the second cylinder 13 comprises the rod cavity of the second cylinder 14 and the rodless cavity of the second cylinder 12.

The rod cavity of the first cylinder 1 is connected to one end of the first oil circuit 15, the other end of the first oil circuit 15 is connected to the first hydraulic control check valve 11, and the other end of the first hydraulic control check valve 11 is connected to the rodless cavity of the second cylinder 12 through the fourth oil circuit 18.

The rodless cavity of the first cylinder 3 is connected to one end of the third oil circuit 17, the other end of the third oil circuit 17 is connected to the second hydraulic control check valve 4, and the other end of the second hydraulic control check valve 4 is connected to the rod cavity of the second cylinder 14 through the second oil circuit 16.

The first oil circuit 15 is connected to one end of the sixth oil circuit 20, the other end of the sixth oil circuit 20 is connected to the directional valve 6, the second oil circuit 16 is connected to one end of the fifth oil circuit 19, and the other end of the fifth oil circuit 19 is connected to the directional valve 6.

Preferably, the directional valve 6 adopts a three-position four-way directional valve, which is preferably a three-position four-way solenoid valve, the two interfaces on one side of the three-position four-way solenoid valve are connected to the fifth oil circuit 19, and the sixth oil circuit 20 respectively, the two interfaces on the other side are connected to the hydraulic pump 7 and the oil tank 9 respectively, the hydraulic pump 7 and the oil tank 9 are connected through oil tubes to realize the hydraulic oil in the oil tank 9 is fed into the directional valve 6.

When the three-position four-way solenoid valve is in the right position, the hydraulic pump 7 can drive the hydraulic oil into the sixth oil circuit 20, and the fifth oil circuit 19 is used for oil return; when the three-position four-way solenoid valve is in the left position, the hydraulic pump 7 can drive the hydraulic oil into the fifth oil circuit 19, and the sixth oil circuit 20 is used for oil return, when the three-position four-way solenoid valve is in the middle position, the hydraulic pump 7 cannot pump the hydraulic oil into the fifth oil circuit 19 and the sixth oil circuit 20.

The oil circuit between the hydraulic pump 7 and the three-position four-way solenoid valve is also connected to the overflow valve 8, and the overflow valve 8 is connected to the oil tank 9.

In this embodiment, the second hydraulic control check valve 4 is unidirectionally conducted along the direction toward the rodless cavity of the first cylinder 3, that is, when the control circuit of the second hydraulic control check valve 5 is not filled with hydraulic oil, the second hydraulic control check valve 4 only allows the hydraulic oil to flow toward the rodless cavity of the first cylinder 3 and does not allow the hydraulic oil to flow out of the rodless cavity of the first cylinder 3.

In this embodiment, along the direction away from the rodless cavity of the second cylinder 12, the first hydraulic control check valve 11 is unidirectionally conducted, that is, in the case that the control circuit of the first hydraulic control check valve 10 is not filled with the hydraulic oil, the first hydraulic control check valve 11 only allows the hydraulic oil to flow outward from the rodless cavity of the second cylinder 12 and does not allow the hydraulic oil to flow to the rodless cavity of the second cylinder 12.

The control circuit of the first hydraulic control check valve 10 and the control circuit of the second hydraulic control check valve 5 are connected to the sixth oil circuit 20.

Embodiment 2

This embodiment discloses a method for the hydraulic system of the slewing mechanism described in Embodiment 1:

When the three-position four-way solenoid valve is in the right position, the hydraulic pump 7 pumps the hydraulic oil in the oil tank 9 into the sixth oil circuit 20, and the hydraulic oil in the sixth oil circuit 20 enters the control circuit of the first hydraulic control check valve 10 and the control circuit of the second hydraulic control check valve 5, the control circuit of the first hydraulic control check valve 10 and control circuit of the second hydraulic control check valve 5 are filled with the hydraulic oil, the piston rod in the first hydraulic control check valve 11 opens the valve core under the action of the hydraulic oil in the control circuit of the first hydraulic control check valve 10, so the hydraulic oil in the sixth oil circuit 20 enters the rodless cavity of the second cylinder 12 through the fourth oil circuit 18, the hydraulic oil of the sixth oil circuit 20 enters the first oil cylinder rod cavity 1 through the first oil circuit 15, the piston rod of the first cylinder 2 contracts, and the piston rod of the second cylinder 13 extends, driving the slewing mechanism to rotate in the first direction, that is, driving the digging end of the backhoe loader to turn left, because the control circuit of the second hydraulic control check valve 5 is filled with oil, the piston rod in the second hydraulic control check valve 4 opens the valve core under the action of the hydraulic oil of the control circuit of the second hydraulic control check valve 5, and the return oil in the rodless cavity of the first cylinder 3 flows back to the oil tank 9 through the third oil circuit 17, the second hydraulic control check valve 4, the fifth oil circuit 19 and the directional valve 6, and at the same time, the return oil in the rod cavity of the second cylinder 14 flows back to the oil tank 9 through the second oil circuit 16, the fifth oil circuit 19 and the directional valve 6.

When braking rapidly from the left-turn state, the three-position four-way solenoid valve is switched from the right position to the middle position. At this time, there is no control hydraulic oil in the first hydraulic control check valve 11 and the second hydraulic control check valve 4, and only one-way flow is allowed, at this time, the piston rod of the first cylinder 2 tends to continue to contract due to inertia, but under the action of the second hydraulic control check valve 4, it cannot continue to contract, the volume of the rodless cavity of the first cylinder 3 is approximately unchanged, so the volume of the rod cavity of the first cylinder 1, the rodless cavity of the second cylinder 12, and the rod cavity of the second cylinder 14 is approximately unchanged, cutting off the hydraulic oil channeling between the first cylinder 2 and the second cylinder 13.

When the three-position four-way valve is in the left position, the hydraulic pump 7 pumps the hydraulic oil into the fifth oil circuit 19, the control circuit of the first hydraulic control check valve 10 and the control circuit of the second hydraulic control check valve 5 are not filled with the high-pressure oil, the hydraulic oil of the fifth oil circuit 19 enters the rodless cavity of the first cylinder 3 through the second hydraulic control check valve 4 and the third oil circuit 17, at the same time, the hydraulic oil of the fifth oil circuit 19 enters the rod cavity of the second cylinder 14 through the second oil circuit 16, the rod of the first cylinder 2 extends out, and the rod of the second cylinder 13 contracts, at this time, the slewing mechanism rotates in the second direction opposite to the first direction, that is, the digging end of the backhoe loader is driven to turn right, the return oil of the rod cavity of the first cylinder 1 flows back to the oil tank 9 through the first oil circuit 15, the sixth oil circuit 20 and the directional valve 6, the return oil of the rodless cavity of the second cylinder 12 flows back to the oil tank 9 through the fourth oil circuit 18, the first hydraulic control check valve 11, the sixth oil circuit 20 and the directional valve 6.

When braking rapidly from the right-turning state, the three-position four-way solenoid valve is switched from the left position to the middle position, there is no control hydraulic oil in the first hydraulic control check valve 11 and the second hydraulic control check valve 4, under the action of inertia, the piston rod of the first cylinder 2 has a tendency to continue to extend, but under the action of the first hydraulic control check valve 11, it cannot continue to extend, the volume of the rod cavity of the first cylinder 1 remains approximately unchanged, which makes the volume of the rodless cavity of the first cylinder 3, the rod cavity of the second cylinder 14 and the rodless cavity of the second cylinder 12 remain approximately unchanged, cutting off the hydraulic oil channeling between the first cylinder 2 and the second cylinder 13.

In the hydraulic system of this embodiment, when the three-position four-way solenoid valve is in the middle braking state, the oil circuit between the first cylinder 2 and the second cylinder 13 is cut off, and the hydraulic oil between the two cylinders will stop moving, the internal pressure and flow pulsation caused by inertia is reduced, which makes the boom brake quickly and the jitter amplitude is reduced, at the same time, it also reduces the damage to the cylinder and other hydraulic system components, and improves the stability and safety of the backhoe loader.

In this embodiment, in the braking state, the volume of the rod cavity and the rodless cavity can only be approximately unchanged due to the sealing issue of the rod cavity and the rodless cavity of the two cylinders, and only a small amount of hydraulic oil moves. However, compared with the existing hydraulic system of the slewing mechanism, it still significantly reduces the jitter amplitude of the boom during braking and improves the braking speed.

Embodiment 3

This embodiment discloses an integrated valve block, which is designed based on the hydraulic system described in Embodiment 1.

As shown in FIG. 2-FIG. 10, the integrated valve block comprises a valve block body 22, the valve block body 22 adopts a cuboid structure with a bottom surface, a top surface, and four sides, in which the two opposite sides with the smaller area are the first side 29 and the second side 41, and the other two opposite sides are the third side 31 and the fourth side 46.

The four corners of valve block body 22 are set with the mounting holes of the valve block body 62, which is used to fix the connection to the backhoe loader through the threaded fasteners such as bolt 25 for the reamed hole.

The top surface of the valve block body 22 is provided with a mounting hole of the hydraulic control check valve 61, which is used to realize the fixed connection between the hydraulic control check valve and the valve block body through fasteners such as screws 28.

The fifth channel 43 is set inside valve block body 22, and the axis of the fifth channel 43 is set along the length direction of the valve block body, one end of the fifth channel 43 extends to the first side 29 to form the first oil port 47.

The sixth channel 44 parallel to the fifth channel 43 is set inside the valve block body 22, and one end of the sixth channel 44 extends to the second side 41 to form the second oil port 48. The first oil port 47 and the second oil port 48 are used to connect with the directional valve.

Free flow outlet interface of the first hydraulic control check valve 58 is connected with the sixth channel 44 through the first connecting channel 38, and the free flow inlet interface of the first hydraulic control check valve 57 is connected with the interface of the rodless cavity of the second cylinder 53 through the fourth channel 37.

In this embodiment, in order to facilitate processing, the first connecting channel 38 comprises the first connecting part 39 and the second connecting part 40, the two parts are perpendicular to each other, and one end of the second connecting part 40 extends to the top surface of the valve block body 22 and is connected to the free flow outlet interface of the first hydraulic control check valve 58, the other end is connected to the first connecting part 39, one end of the first connecting part 39 is connected to the sixth channel 44, and the other end extends to the third side 31 of the valve block body 22 and is blocked by a plugging device. The first connecting part 39 is perpendicular to the sixth channel 44.

Preferably, the inner hexagonal screw plug 24 is used to prevent the leakage of hydraulic oil in the first connecting channel 38, and the inner hexagonal screw plug is in a threaded connection with the interface of the first inner hexagonal screw plug 54 formed by the first connecting part 39 on the third side 31.

Firstly, the first connecting part 39 is processed, so that the first connecting part 39 is connected to the sixth channel 44, and then the second connecting part 40 is processed at the position of the free flow outlet interface of the first hydraulic control check valve 58, so that the first connecting part 39 is connected to the second connecting part 40, and then the inner hexagonal screw plug 24 is used to plug the interface of the first inner hexagonal screw plug 54 formed by the first connecting part 39 on the third side 31.

One end of the fourth channel 37 extends to the third side 31 of the valve block body 22 and is connected to the interface of the rodless cavity of the second cylinder 53, the other end extends to the top surface of the valve block body 22 and is connected to the free flow inlet interface of the first hydraulic control check valve 57, in order to facilitate processing, the fourth channel 37 also adopts two mutually perpendicular parts, part of the channels are processed from the interface of the rodless cavity of the second cylinder 53 of the third side 31, and the other part of the channels are vertically processed on the top surface of the valve block body 22 from the free flow inlet interface of the first hydraulic control check valve 57.

The free flow inlet interface of the second hydraulic control check valve 55 is connected to the fifth channel 43 through the second connecting channel 34, and the free flow outlet interface of the second hydraulic control check valve 56 is connected to the interface of the rodless cavity of the first cylinder 51 through the third channel 35.

The second connecting channel 34 comprises the third connecting part 32 and the fourth connecting part 33, the two parts are perpendicular to each other, and one end of the fourth connecting part 33 extends to the top surface of the valve block body 22 and is connected to the free flow inlet interface of the second hydraulic control check valve 55, the other end is connected to the third connecting part 32, one end of the third connecting part 32 is connected to the fifth channel 43, and the other end extends to the third side 31 of the valve block body 22 and is blocked by the plugging device, the third connecting part 32 is perpendicular to the fifth channel 43.

Preferably, the inner hexagonal screw plug 24 is used to prevent the leakage of hydraulic oil in the second connecting channel 34, and the inner hexagonal screw plug is in a threaded connection with the interface of the second inner hexagonal screw plug 50 formed by the third connecting part 32 on the third side 31.

During processing, the third connecting part 32 is processed first, so that the third connecting part 32 is connected to the fifth channel 43, and then the fourth connecting part 33 is processed at the position of the free flow inlet interface of the second hydraulic control check valve 55, so that the third connecting part 32 is connected to the fourth connecting part 33, and then the inner hexagonal screw plug 24 is used to plug the interface of the second inner hexagonal screw plug 50 formed by the third connecting part 32 on the third side 31.

One end of the third channel 35 extends to the third side 31 of the valve block body 22 and connects the interface of the rodless cavity of the first cylinder 51, and the other end extends to the top surface of the valve block body 22 and connects the free flow outlet interface of the second hydraulic control check valve 56, in order to facilitate processing, the third channel 35 also adopts two mutually perpendicular parts, one part of the channels are processed from the interface of the rodless cavity of the first cylinder 51 of the third side 31, and the other part of the channels are processed from the free flow outlet interface of the second hydraulic control check valve 56 and perpendicular to the top surface of the valve block body 22.

The valve block body 22 is also configured with an interface of the rod cavity of the first cylinder 49 and an interface of the rod cavity of the second cylinder 52.

Among them, the first channel 30 is set inside the valve block body 22, the axis of the first channel 30 is set along the width direction of the valve block body and perpendicular to the sixth channel 44, one end of the first channel 30 extends to the third side 31 and connects to the interface of the rod cavity of the first cylinder 49.

The second channel 36 parallel to the first channel 30 is set inside the valve block body 22, the axis of the second channel 36 is set along the width direction of the valve block body and perpendicular to the fifth channel 43, one end of the second channel 36 extends to the third side 31 and connects to the interface of the rod cavity of the second cylinder 52.

The sixth channel 44 is also connected to the control circuit interface of the first hydraulic control check valve 59 through the control circuit channel of the first hydraulic control check valve 42 and connected to the control circuit interface of the second hydraulic control check valve 60 through the control circuit channel of the second hydraulic control check valve 45. The control circuit channels are vertically arranged with the sixth channel 44, one end of which is connected to the sixth channel 44, and the other end extends to the top surface of the valve block body 22.

The first oil port 47, the second oil port 48, the interface of the rod cavity of the first cylinder 49, the interface of the rodless cavity of the first cylinder 51, the interface of the rodless cavity of the second cylinder 53 are all equipped with pipe joints, in this embodiment, the pipe joint adopts the straight thread connector-assembly, preferably the straight thread short connector-assembly 21, the interface of the rod cavity of the second cylinder 52 is equipped with pipe joints, in this embodiment, the pipe joint adopts the straight thread connector-assembly, preferably the straight thread long connector-assembly 23, to realize the connection between the valve block body and the oil pipe and the oil cylinder, the straight thread short connector-assembly 21 and the straight thread long connector-assembly 23 adopts the existing technology, its specific structure is not described in detail here, long and short only mean that the length of the tubular part of the straight thread long connector-assembly 23 is greater than that of the straight thread short connector-assembly, and its specific length is not limited, it is understandable that technicians in this field can choose other types of pipe joints according to actual needs, and there is no restriction here.

The setup of the first channel 30, the second channel 36, and each interface, and the oil circuits of the first hydraulic control check valve 11 and the second hydraulic control check valve 4 are integrated inside the valve block body in this embodiment, so that when the first hydraulic control check valve and the second hydraulic control check valve are set, there is no need to set multiple oil tubes to cooperate with them, at the same time, it also reduces the number of hydraulic control check valves used, saves costs, and reduces the degree of change to the original hydraulic oil circuit of the slewing mechanism, making the changes simpler and faster. The volume of the integrated valve block is small, making it easy to remove or install.

Embodiment 4

This embodiment discloses a hydraulic system of the slewing mechanism, and the integrated valve block described in Embodiment 3 is set in the system. The first oil port 47 and the second oil port 48 are connected to the directional valve 6 through the straight thread short connector-assembly 21 and the oil pipe respectively, that is, the first oil port 47 and the second oil port 48 are connected to the two interfaces on the side of the three-position four-way solenoid valve through the straight thread short connector-assembly 21 and the oil pipe respectively. The two interfaces on the other side of the three-position four-way solenoid valve are connected to the hydraulic pump 7 and the oil tank 9, and the interface of the rodless cavity of the first cylinder 51 is connected to the rodless cavity of the first cylinder through the straight thread short connector-assembly 21 and the oil pipe, the interface of the rod cavity of the first cylinder 49 is connected to the rod cavity of the first cylinder through the straight thread short connector-assembly 21 and the oil pipe, the interface of the rod cavity of the second cylinder 52 is connected with the rod cavity of the second cylinder through the straight thread long connector-assembly 23 and the oil tubes, and the interface of the rodless cavity of the second cylinder 53 is connected to the rodless cavity of the second cylinder through the straight thread short connector-assembly 21 and the oil tubes.

The above content comprises only the preferred embodiments of this application and is not used to limit this application, for technicians in this field, this application can be subject to various changes and amendments. Any modification, equivalent replacement, improvement, etc. made within the spirit and principles of this application shall be comprised in the scope of protection of this application.

What is claimed is:

1. A hydraulic system of a slewing mechanism, comprising a first cylinder and a second cylinder, a rod cavity of the first cylinder is connected to a rodless cavity of the second cylinder through a first oil circuit, a first hydraulic control check valve, and a fourth oil circuit set in turn, a rod cavity of the second cylinder is connected to a rodless cavity of the first cylinder through a second oil circuit, a second hydraulic control check valve and a third oil circuit set in turn, the first oil circuit is connected to a directional valve through a sixth oil circuit, the second oil circuit is connected to the directional valve through a fifth oil circuit, the directional valve is connected to a hydraulic pump and an oil tank, a control circuit of the first hydraulic control check valve and the second hydraulic control check valve is connected to the sixth oil circuit; the first hydraulic control check valve is unidirectionally conducted in a direction away from the rodless cavity of the second cylinder, and the second hydraulic control check valve is unidirectionally conducted in a direction toward the rodless cavity of the first cylinder.

2. The hydraulic system of the slewing mechanism according to claim 1, wherein the directional valve adopts a three-position four-way directional valve.

3. The hydraulic system of the slewing mechanism according to claim 1, wherein the oil circuit between the hydraulic pump and the directional valve is equipped with an overflow valve, the overflow valve is connected to the oil tank.

4. A method for the hydraulic system of the slewing mechanism according to claim 1, wherein supplying oil to the rod cavity of the first cylinder through the sixth oil circuit and the first oil circuit by the directional valve, and contracting a piston rod of the first cylinder, at the same time, control circuit supplying oil to open a valve core of the first hydraulic control check valve, feeding oil into the rodless cavity of the second cylinder via the fourth oil circuit, extending the piston rod of the second cylinder to realize a rotation of the slewing mechanism in a first direction;

when the slewing mechanism is braked in a rotating state toward the first direction, the directional valve works, and stops supplying oil to the sixth oil circuit and the control circuit, the oil in the rodless cavity of the first cylinder cannot flow under an action of the second hydraulic control check valve, thus cutting off an oil channeling between the first cylinder and the second cylinder;

supplying oil to the rodless cavity of the first cylinder through the fifth oil circuit, the second hydraulic control check valve, and the third oil circuit by the directional valve, and supplying oil to the rod cavity of the second cylinder through the second oil circuit by the directional valve, extending the piston rod of the first cylinder and retracting the piston rod of the second cylinder to realize a rotation of the slewing mechanism in the second direction opposite to the first direction;

when the slewing mechanism is braked in a rotating state toward the second direction, the directional valve works, and stops supplying oil to the fifth oil circuit, the oil in the rod cavity of the first cylinder cannot flow under an action of the first hydraulic control check valve, thus cutting off the oil channeling between the first cylinder and the second cylinder.

* * * * *